United States Patent [19]

Minoura et al.

[11] Patent Number: 5,054,895
[45] Date of Patent: Oct. 8, 1991

[54] ELECTROCHROMIC ELEMENT

[75] Inventors: Jun Minoura, Anjo; Toshiya Uemura, Nagoya; Shigeyuki Takahashi, Inazawa; Toshiyasu Ito, Kasugai; Katsuaki Okabayashi, Nagoya, all of Japan

[73] Assignees: Toyoda Gosei Co. Ltd., Nishikasugai; Kabushiki Kaisha Toyota Chuo Kenkyusho, Aichi, both of Japan

[21] Appl. No.: 332,967

[22] Filed: Apr. 4, 1989

[30] Foreign Application Priority Data

Apr. 8, 1988 [JP] Japan .................................. 63-87668

[51] Int. Cl.$^5$ ................................................ G02F 1/01
[52] U.S. Cl. ................................................... 359/265
[58] Field of Search ........................................... 350/357

[56] References Cited

U.S. PATENT DOCUMENTS

| 4,664,934 | 5/1987 | Ito et al. | 427/38 |
| 4,750,816 | 6/1988 | Ito et al. | 350/357 |
| 4,832,468 | 5/1989 | Ito et al. | 350/357 |
| 4,927,246 | 5/1990 | Ito et al. | 350/357 |

FOREIGN PATENT DOCUMENTS

| 304219 | 9/1987 | Japan | 350/357 |
| 0253925 | 10/1988 | Japan | 350/357 |
| 7602620 | 9/1976 | Netherlands | 350/357 |
| 2117390 | 10/1983 | United Kingdom | 350/357 |

Primary Examiner—Eugene R. LaRoche
Assistant Examiner—Evelyn A. Lester
Attorney, Agent, or Firm—Cushman, Darby & Cushman

[57] ABSTRACT

The present invention relates to an electrochromic element for use in various types of displays and dimming devices, and having a structure comprising bases, a pair of electrodes provided on the bases, at least one of the electrodes being a transparent electrode, color-forming layers provided between the pair of electrodes, and electrolyte superposed with the color-forming layers, and also provided between the pair of electrodes, and a light stabilizer made to be contained in the color-forming layers by being contained in the electrolyte.

17 Claims, 1 Drawing Sheet

ELECTROCHROMIC ELEMENT

BACKGROUND OF THE INVENTION

1. Field of the Invention

The present invention relates to an electrochromic element for use in various types of displays and dimming devices.

2. Description of the Related Art

Electrochromic elements are conventionally equipped with a pair of spaced apart electrodes at least one of which is transparent. A pair of color-forming layers are positioned between the electrodes and an electrolyte is sandwiched between the color-forming layers. Typically, the electrodes are mounted on transparent bases such as glass or plastic.

The color-forming layers typically include an oxidative color-forming layer and a reductive color-forming layer. In one proposed construction, polyaniline is used as the oxidative color-forming layer and tungsten oxide is used as the reductive color-forming layer.

However, conventional electrochromic elements tend to have low durability. This is because sunlight deteriorates the oxidative color-forming layer made of polyaniline.

To improve the durability, some planar electrochromic dimmers are provided with filters to block ultraviolet and infrared ray. However, such filters complicate the production process as well as increase the number of parts for the electrochromic element.

SUMMARY OF THE INVENTION

The object of the present invention is to provide an electrochromic element that has improved durability when exposed to sunlight. Another object is to provide an electrochromic element that has a simplified production process and which requires a small number of parts.

To achieve the foregoing and other objects and in accordance with the purpose of the present invention, an electrochromic element is provided that has a pair of electrodes, each of which is carried by an associated base member. At least one of the electrodes is transparent. A pair of color-forming layer are provided between the electrodes. An electrolyte is disposed between the color-forming layers. A first one of the color forming layers has a light stabilizer contained therein said. The light stabilizer improves the resistance of the color-forming layers to light.

In a preferred embodiment, the color forming layer having the light stabilizer therein is the oxidative color-forming layer. In another preferred embodiment, the concentration of the light stabilizer in the color-forming layer is in the range of 0.1 to 1.0 percent by weight.

In a preferred production process aspects of the present invention, the light stabilizer is initially introduced into the electrolyte. The concentration of the light stabilizer is selected to diffuse into said first color-forming layer after assembly of the electrochromic element.

In an alternative preferred production process, the first color-forming layer is formed by electro-polymerization in an electrodepositing solution having a light stabilizer mixed therein. The light stabilizer is thus incorporated into the first color-forming layer during electropolymerization.

In yet another alternative preferred production process, the first color-forming layer is formed by electropolymerization. Thereafter, the light stabilizer is introduced to the first color-forming layer by immersing the color-forming layer in a solution containing the light stabilizer. The concentration of the light stabilizer in the immersion bath is chosen to cause the light stabilizer to diffuse into the first color-forming layer.

Other objects of the present invention will become clear with an understanding of the embodiments to be described later, and as stated in the appended claims. Also, further advantages not mentioned in this specification will become apparent to one skilled in the art upon application of the present invention.

DETAILED DESCRIPTION OF THE PREFERRED EMBODIMENTS

Figure 1:
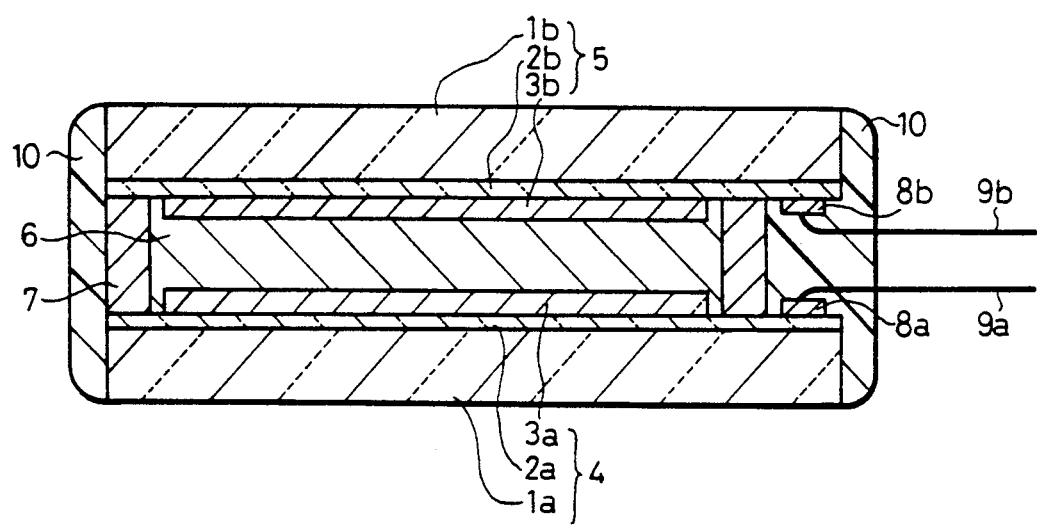
FIG. 1 is a sectional view showing a planar electrochromic dimmer of each embodiment of the present invention.

The main points of the various structures of the present invention are described below.

A suitable base material is glass. Alternatively, resins such as polymethylmetacrylate, polycarbonate, polyether sulfon, polyether ketone and the like may be used. A transparent electrode layer such as ITO [indium trioxide ($In_2O_3$) containing 5% by weight of tin dioxide ($SnO_2$)], or the like, is used to form the electrode layers. The transparent electrode layer may be formed by ion plating one entire surface of each base to a thickness of about 2000 Å.

Polyaniline, polypyrrole, polythiophene, and the like may be used as the oxidative color-forming layer. The oxidative color-forming layer is formed by electropolymerization or similar known techniques to a thickness of about 6000 Å.

The reductive color-forming layer is an inorganic material made of tungsten trioxide ($WO_3$), molybdenum trioxide ($MoO_3$) titanium dioxide ($TiO_2$) or the like. The reductive color-forming may be formed by vacuum deposition or similar known techniques to provide a layer having a thickness of about 6000 Å.

The electrolyte is an organic electrolyte. It may be obtained by dissolving lithium perchlorate ($LiClO_4$), lithium tetrafluoroborate ($LiBF_4$), or the like, in propylene carbonate to form a 1M concentration. An ultraviolet curing resin is also mixed therein. Then, the resulting mixture is hardened by exposure to ultraviolet rays.

Suitable light stabilizers include benzotriazole-type ultraviolet ray absorbents, benzophenone-type ultraviolet ray absorbents, phenol-type antioxidants (often simply called antioxidants), nickel-complex-type stabilizers and amine-type stabilizers. These light stabilizers improve the durability of the electrochromic element by effectively preventing deterioration of the color-forming layers (particularly the oxidative color-forming layer) due to exposure to sunlight.

By way of example, a suitable benzotriazole-type ultraviolet ray absorbent is sold by CIBA-GEIGY Ltd. under the trade name Tinuvin P. A suitable benzophenone-type ultraviolet ray absorbent is sold by BASF JAPAN Ltd. under the trade name Uvinul MS-40. Both of these absorbents are commonly referred to simply as ultraviolet ray absorbents. Suitable phenol-type antioxidants include CIBA-GEIGY's products Irganox 5057, 245, 1081, 1035, 1076, 565, 1098, 1330, 1425WL, 259, and 1010. Suitable nickel-complex-type stabilizers include Antigene NBC and Sumisorb 612 produced by Sumitomo Chemical Co., Ltd. Representative amine-type stabilizers include Sanol LS-770 and LS-765 sold by Sankyo Co., Ltd., and Tinuvin 144 sold by CIBA-GEIGY Ltd.

A suitable concentration of the light stabilizer in the oxidative color-forming layer is within the range of 0.1 to 1.0 percent by weight. When the concentration is less than 0.1% by weight, the oxidative color-forming layer still easily deteriorates when exposed to sunlight. On the other hand, when the concentration is more than 1.0% by weight, the light stabilizer separates from the oxidative color-forming layer, which results in the impairment of the coloring effect of the oxidative color-forming layer.

Electropolymerization is a preferred method of forming the oxidative color-forming layer. By way of example, a base having a transparent ITO electrode layer formed thereon is initially formed. The electropolymerization process may then be performed by immersing this base and a counter electrode into an electrodepositing solution containing aniline. Then a polyaniline layer (that functions as the oxidative color-forming layer) is formed on the ITO layer by electrodeposition. During electrodeposition, a DC voltage of less than 500 mv is applied to the ITO layer and a negative voltage is applied to the counter electrode.

FIRST EMBODIMENT

A first embodiment in accordance with the present invention will be described with reference to FIG. 1. As shown therein, a lower electrode-equipped base 4 includes a transparent base 1a made of polymethylmetacrylate, a transparent electrode layer 2a made of ITO and a reductive color-forming layer 3a made of $WO_3$. The electrode layer 2a is formed on the upper surface of base 1a and the reductive color-forming layer 3a is formed on the upper surface of the electrode layer 2a. The transparent electrode layer 2a is formed by ion plating to a thickness of about 2000 Å. The reductive color-forming layer 3a is formed by vacuum deposition to a thickness of about 6000 Å.

Likewise, an upper electrode-equipped base 5 includes a transparent base 1b, a transparent electrode layer 2b, and an oxidative color-forming layer 3b. The electrode layer 2b is formed on the lower surface of the base 1b and the oxidative color-forming layer 3b is formed on the lower surface of electrode layer 2b. The base 1b and electrode layer 2b are formed similarly to the corresponding components in lower electrode-equipped base 4. The oxidative color-forming layer 3b is made of polyaniline and is formed by electro-polymerization to a thickness of about 6000 Å.

The upper and lower electrode-equipped bases 4, 5 are then superposed such that the color-forming layers face one another with spacers 7 therebetween. The spacers 7 are arranged to encircle an electrolyte 6.

To create the electrolyte 6, $LiClO_4$ is dissolved in propylene carbonate to form a 1M organic electrolyte solution. The solution is then mixed with an ultraviolet curing resin in a weight ratio of 3:1. The ultraviolet curing resin is selected such that it is soluble in the organic electrolyte solution. Then a light stabilizer is mixed into this liquid mixture. The light stabilizer includes Irganox 259, Tinuvin P and Tinuvin 144 (each set forth above). The volumes used are such that the resultant mixture includes 0.2% by weight of Irganox 259, 0.4% by weight of Tinuvin P, and 0.4% by weight of Tinuvin 144.

The resulting mixture is then injected into the space formed by the electrode-equipped bases 4, 5 and the spacers 7. The electrolyte is then exposed to ultraviolet rays which solidifies the mixture. Since the electrolyte 6 is then a solid-like electrolyte, it is easily formed and, at the same time, easy to handle. It is noted, however, that liquid or semi-solid electrolytes may be readily substituted for the described solid electrolyte.

The concentration of the light stabilizers mixed into the electrolyte 6 is about the same as the concentration which is desired in the oxidative color-forming layer 3b. Thus, the total concentration in this embodiment is 1.0% by weight. As explained below, some of the light stabilizers will then diffuse into the oxidative color-forming layer 3b.

An electrode connector 8a is provided on one end of the transparent electrode layer 2a. It is attached by a conductive paste. A lead wire 9a is then connected to the electrode connector 8a. Likewise a second electrode connector 8b and lead wire 9b are connected to one end of the transparent electrode layer 2b.

A sealing portion 10 made of epoxy resin is provided on the end surfaces of the electrode-equipped bases 4, 5.

The operation of the described planar electrochromic dimmer will now be explained. When a "coloring" voltage of +1.4 V is applied to the lead wire 9b, it is transmitted to the transparent electrode 2b via the connector 8b. This causes an oxidation reaction to occur in the oxidative color-forming layer 3b. At the same time, a reduction reaction occurs in the reductive color-forming layer 3a. Thus, the electrochromic dimmer turns blue.

When a "discoloring" voltage of −2.1 V is applied to the lead wire 9b (and thus transparent electrode 2b), a reverse chemical reaction occurs which causes the electrochromic dimmer to lose its color.

To test the described electrochromic dimmer, a weathering test was performed using a sunshine weather meter (JIS-D0205 weathering test for automobile parts). No substantial changes in the characteristics of the electrochromic dimmer were observed even after continuous coloring and discoloring for more than 1000 hours. In contrast, similar tests on a planar electrochromic dimmer that did not include a light stabilizer showed that the electrochromic dimmer deteriorates in about 400 hours.

From these results, it was confirmed that the light stabilizer mixed into the electrolyte diffused into the adjacent oxidative color-forming layer 3b made of polyaniline. As a result, improved endurance to light was observed. This is due to the light stabilizer's absorption of ultraviolet rays. The light stabilizer thus prevents the oxidative reaction that may be induced by the light.

Additionally, in the described dimmer, the amount of electricity flowing within the electrolyte 6 increased by approximately 50%, which resulted in a high coloring concentration. This is due to the fact that the light stabilizer contributes to the electrochemical reaction, exhibiting some kind of a boosting effect.

As mentioned above, the planar electrochromic dimmer of the present invention has good durability and does not require a filter for blocking ultraviolet rays. Accordingly, the number of parts required for the electrochromic dimmer can be reduced.

SECOND EMBODIMENT

The planar electrochromic dimmer of the second embodiment has the same generic structure as that of the first embodiment described above. However, it differs from the first embodiment in the method by which the oxidative color-forming layer 3b is made. In essence, the light stabilizer is introduced to the polyaniline oxidative color-forming layer during electropolymerization rather than through the electrolyte.

The electrodepositing solution used in the electropolymerization process is obtained by dissolving 2.5% by weight of Uvinul-MS40 in a mixed solution. The Uvinul-MS40 functions as a light stabilizer. The mixed solution includes a 0.1M concentration of aniline, a 0.2M concentration of perchloric acid ($HClO_4$), and a 0.01M concentration of a potassium salt of polyvinyl sulfonic acid. The resultant electrodeposition solution efficiently performs electro-polymerization of polyaniline. The described light stabilizer solution causes the deposited polyaniline layer to include in the range of 0.1 to 1.0 percent by weight of the light stabilizer.

A weathering test was performed on this electrochromic dimmer in the same manner as in the first described embodiment. Again, it was observed that there were no substantial change in the properties of the dimmer even after 1000 hours of testing.

Since the light stabilizer is mixed with the oxidative color-forming layer 3b during its formation, the described process has improved manufacturing efficiency.

THIRD EMBODIMENT

The planar electrochromic dimmer of the third embodiment has the same generic structure as the first and second embodiments. Again, the difference is in the method in which the light stabilizer is introduced to the oxidative color-forming layer. In this embodiment, the polyaniline oxidative color-forming layer is immersed in a solution containing a light stabilizer after the electropolymerization process.

As described in the first embodiment, a liquid perchloric acid solution is used as the electrodepositing solution during electropolymerization. Therefore, after the polyaniline layer has been formed, it is washed with a liquid solution of 0.01M perchloric acid. It is then immersed in a liquid organic electrolyte containing a light stabilizer. This allows the light stabilizer to permeate into the polyaniline layer. Thereafter, the polyaniline layer is washed with a propylene carbonate and vacuum dried. The liquid organic electrolyte solution used is propylene carbonate having a 1M concentration of $LiClO_4$ dissolved therein. Additionally, a light stabilizer is mixed and dissolved into the solution. The light stabilizer constitutes 1.0% by weight of the mixed electrolyte solution. Specifically, 0.2% Irganox 259, 0.4% Tinuvin P and 0.4% Tinuvin 144 (each by weight) are used.

A weathering test was performed on an electrochromic dimmer constructed in accordance with the present embodiment. Again, good durability and light resistance were observed. Specifically, no substantial changes were observed in the properties of the electrochromic dimmer even after 1000 hours of testing. This is again due to the fact that the light stabilizer sufficiently permeated the polyaniline layer.

As many apparent and widely different embodiments of the present invention may be made without departing from the spirit or scope thereof, it is to be understood that the invention is not limited to the specific embodiments set forth herein, but rather is defined in the appended claims.

What is claimed is:

1. An electrochromic element comprising:
   first and second base members;
   a pair of electrodes, each electrode being carried by an associated base member, at least one of the electrodes being transparent;
   first and second color-forming layers provided between said electrodes;
   an electrolyte provided between said color-forming layers; and
   a light stabilizer provided in said first color-forming layer for improving the resistance of said color-forming layers to light.

2. An electrochromic element as set forth in claim 1, wherein said electrolyte is a liquid organic electrolyte containing an ultraviolet curing resin hardened by exposure to ultraviolet rays.

3. An electrochromic element as set forth in claim 1 wherein said light stabilizer is selected from the group consisting of a benzotriazole-type ultraviolet ray absorbent, a benzophenone-type ultraviolet ray absorbent, a phenol-type antioxidant, a nickel-complex-type stabilizer, and an amine-type stabilizer.

4. An electrochromic element as set forth in claim 1, wherein the concentration of the light stabilizer in the first color-forming layer is within the range of about 0.1 to 1.0% by weight.

5. An electrochromic element as recited in claim 1 wherein said first color-forming layer is an oxidative color-forming layer.

6. An electrochromic element as recited in claim 5 wherein said oxidative color-forming layer includes polyaniline.

7. An electrochromic element as recited in claim 1 wherein said the light stabilizer is initially introduced into said electrolyte, the light stabilizer being selected to diffuse into said first color-forming layer after assembly of the electrochromic element.

8. An electrochromic element as set forth in claim 1 wherein said first color-forming layer is formed by electropolymerization in an electrodeposition solution having a light stabilizer mixed therein, the light stabilizer being incorporated into the first color-forming layer during electropolymerization.

9. An electrochromic element as set forth in claim 8 wherein said electrodeposition solution includes perchloric acid and a potassium salt of polyvinyl sulfonic acid.

10. An electrochromic element as set forth in claim 1 wherein:
    said first color-forming layer is formed by electropolymerization; and
    the light stabilizer is introduced to the first color-forming layer by immersing the color-forming layer in a solution containing the light stabilizer.

11. An electrochromic element comprising:
    first and second base members;
    a pair of electrodes, each electrode being carried by an associated base member, at least one of the electrodes being transparent;
    first and second color-forming layers provided between said electrodes, the first color-forming layer being oxidative and the second color forming layer being reductive;

an electrolyte provided between said color-forming layers; and a light stabilizer contained in said first color-forming layer for improving the resistance of said color-forming layer to light, the concentration of the light stabilizer in the color-forming layer being in the range of 0.1 to 1.0 percent by weight; and wherein the light stabilizer includes at least one selected from the group consisting of a benzotriazole-type ultraviolet ray absorbent, a benzophenone-type ultraviolet ray absorbent, a phenol-type antioxidant, a nickel-complex type stabilizer, and an amine-type stabilizer.

12. In a method for forming an electrochromic element having a pair of spaced apart electrodes, an oxidative color-forming layer formed on a first one of the electrodes, a reductive color-forming layer formed on a second one of the electrodes and an electrolyte sandwiched between the color-forming forming layers, the improvement comprising the step of introducing a light stabilizer into the oxidative color-forming layer, wherein the light stabilizer constitutes in the range of 0.1 to 1.0 percent of the color-forming layer.

13. A method of forming an electrochromic element as set forth in claim 12 wherein said oxidative color-forming layer is formed by electro-polymerization in an electrodeposition solution having a light stabilizer mixed therein, the light stabilizer being incorporated into the first color-forming layer during electropolymerization.

14. A method for forming an electrochromic element as recited in claim 13 wherein the concentration of the light stabilizer in said electrodeposition solution is about 2.5 percent by weight of the solution.

15. A method for forming an electrochromic element as recited in claim 12, wherein the light stabilizer is mixed into said electrolyte, the concentration of the light stabilizer in the electrolyte being selected to cause the desired amount of said light stabilizer to diffuse into said oxidative color-forming layer after assembly of the electrochromic element.

16. A method for forming an electrochromic element as recited in claim 15 wherein the concentration of the light stabilizer in said electrolyte is in the range of 0.1 to 1.0 percent by weight of the electrolyte.

17. A method for forming an electrochromic element as set forth in claim 12 wherein:

said oxidative color-forming layer is formed by electropolymerization; and the light stabilizer is introduced to the oxidative color-forming layer by immersing the oxidative color-forming layer in a solution containing the light stabilizer, the concentration of the light stabilizer being chosen to cause the light stabilizer to diffuse into the first color-forming layer.

* * * * *